(12) United States Patent
Treudt et al.

(10) Patent No.: US 9,925,493 B2
(45) Date of Patent: Mar. 27, 2018

(54) DEVICE FOR STORING AND DELIVERING A LIQUID ADDITIVE, IN PARTICULAR FOR CATALYTIC EXHAUST GAS $NO_x$ REMOVAL IN A MOTOR VEHICLE

(71) Applicant: Kautex Textron GmbH & Co. KG, Bonn (DE)

(72) Inventors: Volker Treudt, Windeck (DE); Thomas Wagner, Kerpen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/438,839

(22) PCT Filed: Mar. 13, 2013

(86) PCT No.: PCT/EP2013/000739
§ 371 (c)(1),
(2) Date: Apr. 27, 2015

(87) PCT Pub. No.: WO2014/063760
PCT Pub. Date: May 1, 2014

(65) Prior Publication Data
US 2015/0283506 A1    Oct. 8, 2015

(30) Foreign Application Priority Data

Oct. 25, 2012   (DE) .................. 10 2012 020 948

(51) Int. Cl.
A61L 9/00 (2006.01)
B01D 53/94 (2006.01)
F01N 3/20 (2006.01)

(52) U.S. Cl.
CPC ....... *B01D 53/9431* (2013.01); *F01N 3/2066* (2013.01); *F01N 2610/02* (2013.01);
(Continued)

(58) Field of Classification Search
CPC ..... F01N 3/20; A61L 2/00; A61L 9/00; A61L 9/14; B05B 17/00
(Continued)

(56) References Cited

U.S. PATENT DOCUMENTS 8,464,966 B2   6/2013   Haeberer et al.
8,943,812 B2   2/2015   Schepers et al.
(Continued)

FOREIGN PATENT DOCUMENTS

DE   20119512 U1   2/2002
EP   1925354 A1   5/2008
(Continued)

OTHER PUBLICATIONS

English language PCT International Search Report dated Jan. 28, 2014, received in corresponding PCT Application No. PCT/EP13/00739, 5 pgs.
(Continued)

*Primary Examiner* — Monzer R Chorbaji
(74) *Attorney, Agent, or Firm* — Grossman Tucker Perreault & Pfleger, PLLC

(57) ABSTRACT

The invention relates to a device for storing and delivering a liquid additive for catalytic exhaust gas $NO_x$ removal in a motor vehicle, the device comprising a storage vessel (2), in which a delivery line (5), heated filter elements (7) and a combined sensor (12) are arranged. A delivery pump (8) is arranged outside the storage vessel (2). The filter elements (7), the combined sensor (12) and the delivery pump (8) are configured as subassemblies which are connected electrically and/or hydraulically to one another and are separated from one another spatially.

18 Claims, 2 Drawing Sheets

(52) U.S. Cl.
CPC .. *F01N 2610/10* (2013.01); *F01N 2610/1406* (2013.01); *F01N 2610/148* (2013.01); *F01N 2610/1426* (2013.01); *F01N 2610/1433* (2013.01); *Y02T 10/24* (2013.01)

(58) Field of Classification Search
USPC .......................... 422/123, 305–306; 60/301
See application file for complete search history.

(56) References Cited

U.S. PATENT DOCUMENTS

| | | | |
|---|---|---|---|
| 9,038,442 | B2 | 5/2015 | Reimer et al. |
| 9,074,510 | B2 | 7/2015 | Bauer et al. |
| 2006/0051276 | A1 | 3/2006 | Schaller et al. |
| 2010/0199641 | A1 | 8/2010 | Sague et al. |
| 2011/0120984 | A1 | 5/2011 | Cook et al. |
| 2011/0138787 | A1 | 6/2011 | Radillo et al. |
| 2011/0232271 | A1 * | 9/2011 | Haeberer ............... F01N 3/2066 60/295 |
| 2013/0025269 | A1 | 1/2013 | Hodgson et al. |
| 2013/0219869 | A1 | 8/2013 | Brueck et al. |
| 2013/0233850 | A1 | 9/2013 | Truedt |

FOREIGN PATENT DOCUMENTS

| | | | | |
|---|---|---|---|---|
| EP | 2161422 | A2 | 3/2010 | |
| WO | 2011012437 | A1 | 2/2011 | |
| WO | WO 2012/062400 | A1 * | 4/2012 | ............... F01N 3/20 |
| WO | 2012130493 | A1 | 10/2012 | |

OTHER PUBLICATIONS

English language PCT Written Opinion dated Jan. 28, 2014, received in corresponding PCT Application No. PCT/EP13/00739, 7 pgs.

English language PCT International Preliminary Report on Patentability dated Feb. 16, 2015, received in corresponding PCT Application No. PCT/EP13/00739, 7 pgs.

* cited by examiner

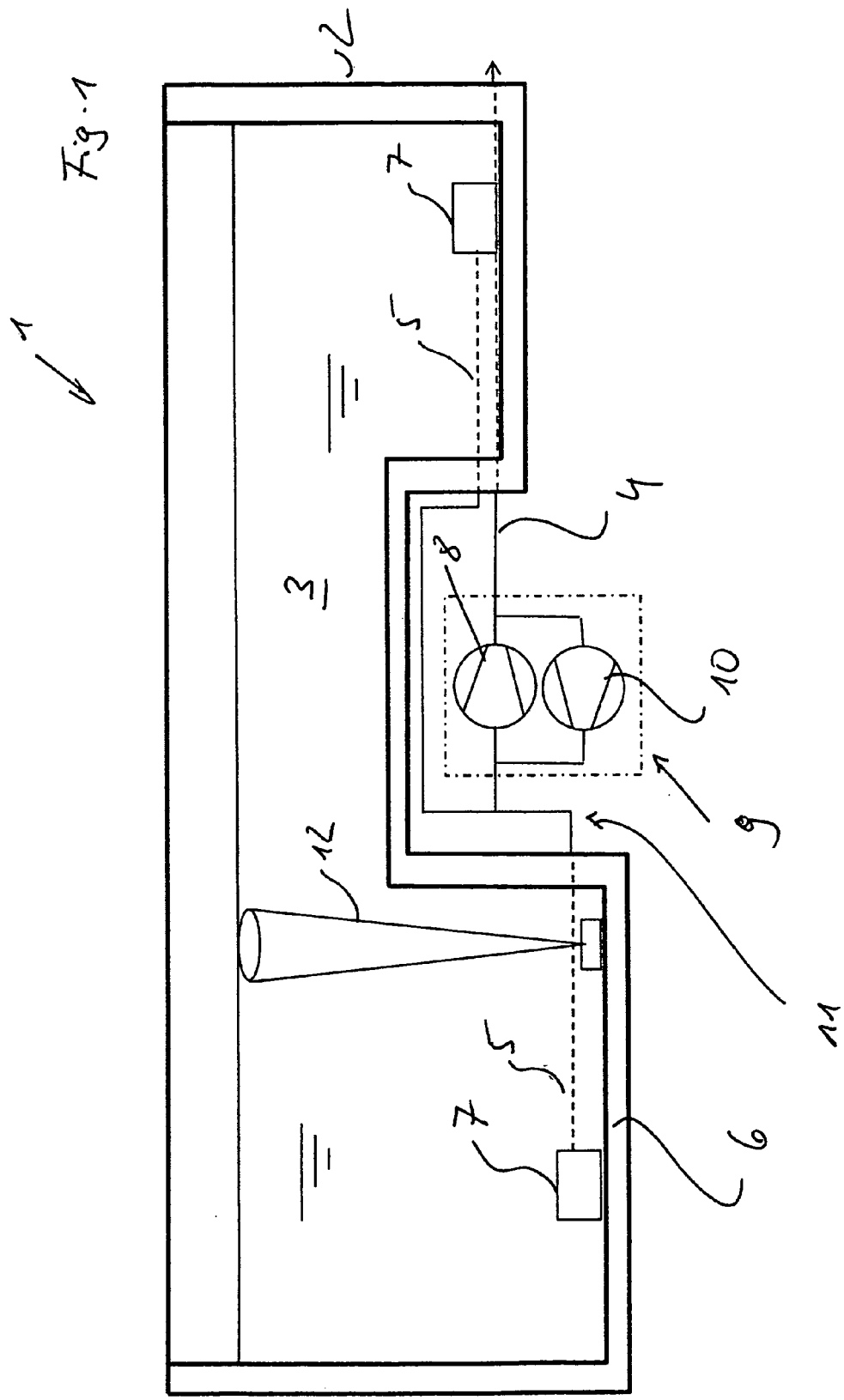

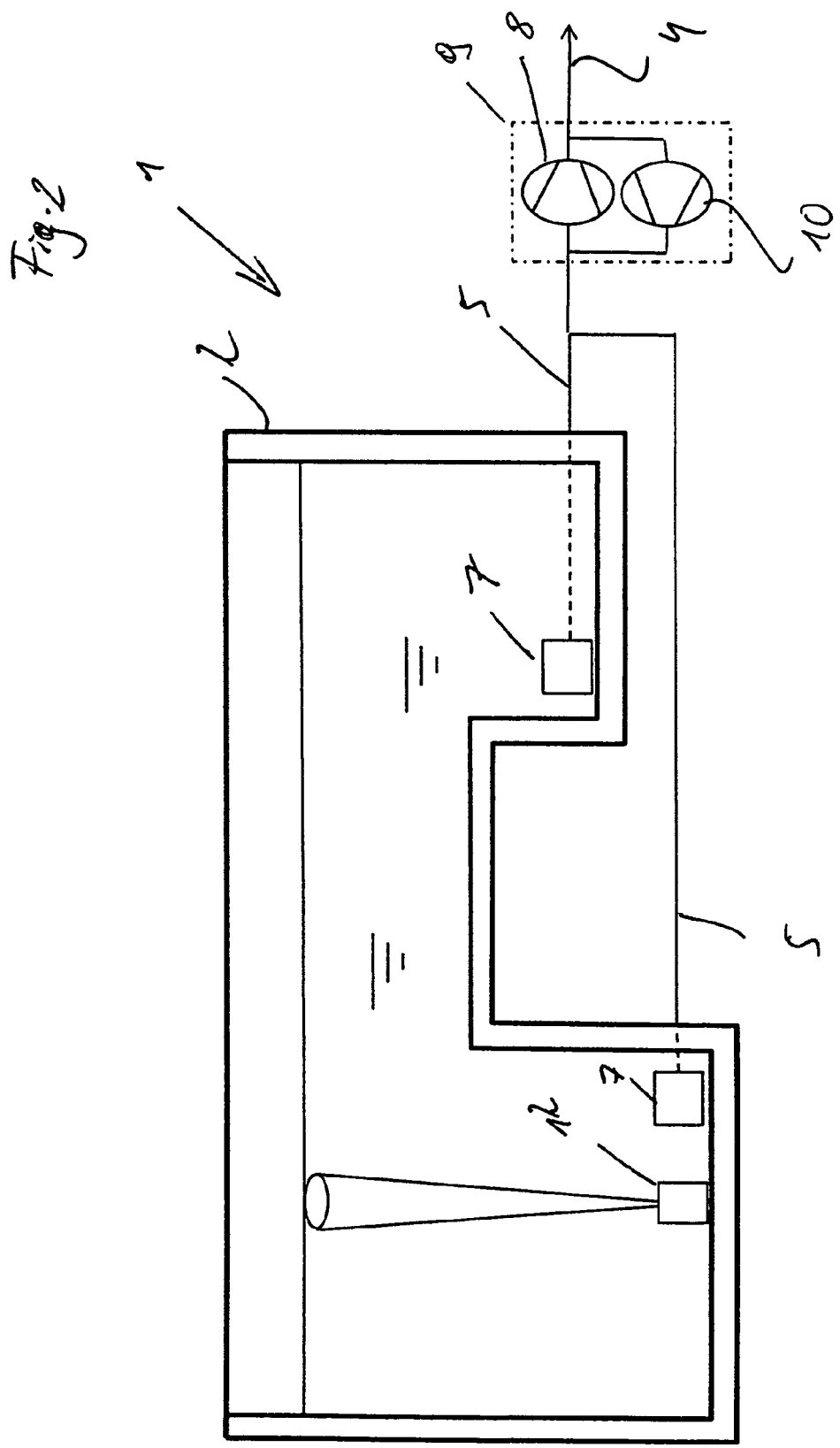

DEVICE FOR STORING AND DELIVERING A LIQUID ADDITIVE, IN PARTICULAR FOR CATALYTIC EXHAUST GAS NO$_x$ REMOVAL IN A MOTOR VEHICLE

The invention relates to a device for storing and delivering a liquid additive, in particular for catalytic exhaust gas NO$_x$ removal in a motor vehicle, comprising at least one storage vessel which encloses a storage volume for the additive, at least one delivery pump and a delivery line for delivering the additive to a consumer.

Devices of this type for storing additive are generally also called what are known as SCR vessels. The storage vessels usually contain an aqueous urea solution for exhaust gas NO$_x$ removal in diesel vehicles (selective catalytic reduction).

In order that the aqueous urea solution does not freeze if a defined external temperature is undershot, measures are provided for heating the storage volume and/or for heating a smaller melting volume, in order to ensure a supply of the consumer with urea solution at low external temperatures.

The abovementioned devices are installed both in trucks and in buses and passenger cars. In passenger cars, the storage vessels are installed, in particular, in a region which cannot readily be viewed of the available installation space of the motor vehicle. Since the storage volume is frequently dimensioned in such a way that refilling of the vessels can take place at the service intervals of the vehicle, optimum installation space utilization in the motor vehicle plays a special role in the case of a comparatively large storage volume.

Known devices for aftertreatment of the exhaust gas of an internal combustion engine with aqueous urea solutions are known, for example, from DE 102 51 588 A1, from DE 2008 008 324 A1 and from EP 2 161 422 A2. In particular in the case of relatively recent variants of devices of this type, an integrated construction has established itself, such as is described, for example, in EP 2 161 422 A2. According to this, a liquid delivery pump, heating devices, filters, etc. are integrated into the storage vessel. For example, it is known to combine said parts in a delivery module which is fastened to the bottom of the storage vessel.

An integrated design of this type has the advantage of comparatively simple mounting inside the motor vehicle, in particular on account of the exchangeability of the entire device as a module or possibly on account of the exchangeability of the delivery device which is arranged inside the storage vessel.

However, an arrangement of this type is associated with the disadvantage that certain limits are set for the design of the geometry of the storage vessel and/or the storage volume, in particular because the delivery module has to be fastened at a central point in the vessel. Considered from the aspect of the installation situation, it is desirable, however, to select the geometry of the storage vessel such that the storage vessel can be arranged in the remaining installation space inside the motor vehicle, with as great a volume utilization as possible, as close as possible to the ground clearance line of the motor vehicle.

The ground clearance line is generally understood to be a structurally predefined boundary line, below which in the direction of the roadway no components with the exception of the wheels may be arranged inside the body of the vehicle.

WO 2010/078991 A1 discloses a dosing system for introducing a reducing agent into the exhaust gas system of an internal combustion engine, the dosing system having a reservoir for holding the reducing agent, a delivery unit, a level sensor and a dosing module, wherein the reservoir is a standard reservoir which is integrated into a fuel tank. An object of WO 2010/078991 is to provide a dosing system which allows a greater degree of freedom as regards to utilization of the small amount of installation space available by a standard system. Therefore, WO 2010/078991 A1 aims to utilize the restricted space offered in a vehicle by a dosing system. This object of WO 2010/078991 is solved by the feature, that the reservoir is realized as a standard reservoir having a volume between 2 liters and 10 liters, whereby the geometry of the fuel tank, into which the standard reservoir is inserted, is adapted to the standard geometry of the standard reservoir.

WO 2011/064050 A1 discloses a method for determining the state of a reducing agent in a reducing agent tank defining a storage volume. The reducing agent tank comprises a delivery pump, a delivery line which is arranged at least partially inside the storage volume and via which the additive can be fed by means of the delivery pump of an injection device to an exhaust gas section of a motor vehicle, one filter device for filtering the additive to be delivered and one filing level sensor.

EP 1 925 354 A1 discloses a catalytic reduction device for a catalytic reduction of NO$_x$ in exhaust systems, having a reduction agent tank and a reduction agent pump, wherein the reduction agent pump at least partially is arranged inside the reduction agent tank or is directly arranged next to the reduction agent tank. The pump and the reduction agent filter are surrounded by a cage, so that the pump and the reduction agent filter are realized as a integrated combined assembly.

FR 2 919 666 discloses a system for controlling a reagent dispensing circuit in an exhaust line of an engine, wherein the circuit comprises a reservoir, injection means, reagent conditioning means, sensors suitable for determining parameters representing the status of the dispensing circuit and of the reagent, and command actuators for the conditioning means and the injection means.

The invention is therefore based on the object of providing a device of the type mentioned at the outset, which device is designed in such a way that more degrees of freedom are available for the selection of the vessel contour.

The object is achieved by a device for storing and delivering a liquid additive, in particular for catalytic exhaust gas NO$_x$ removal in a motor vehicle, comprising at least one storage vessel which defines a storage volume for the additive, at least one delivery pump, at least one delivery line which is arranged at least partially inside the storage volume and via which the additive can be fed by means of the delivery pump of an injection device to an exhaust gas section of a motor vehicle, at least one filter device for filtering the additive to be delivered, at least one heating device for providing at least one ice-free part quantity of the additive at low ambient temperatures, and at least one filling level sensor and/or one quality sensor for the stored additive, at least the filter device, the filling level sensor and/or the quality sensor and the delivery pump being configured as subassemblies which are connected electrically and/or hydraulically to one another and are separated from one another spatially.

In the context of the invention, a quality sensor is to be understood to be a sensor, by way of which faulty filling of the storage vessel can be detected. The detection of the correctly filled additive can take place via a very wide variety of physical parameters of the additive, for example via a density measurement or via a conductivity measurement of the filled medium.

The invention can be summarized such that, in the device according to the invention, all the functional units are divided into functional groups which are arranged in a decentralized manner or decentrally inside the storage vessel or on the storage vessel. The position of the functional units which comprise at least one delivery pump, at least one filter device and at least one heating device and at least one filling level sensor and/or one quality sensor can be selected freely on the storage vessel. The location of the delivery line and its branch in the storage vessel can likewise be selected freely and is stipulated only by the arrangement of the functional units with respect to one another. As a result, the storage vessel can be realized with a smaller vessel bottom area, the shape of which is not necessarily predefined by the design of the functional units.

In one preferred variant of the device according to the invention, it is provided that at least one filter device and one filling level sensor inside the storage volume are fastened to a wall of the storage vessel, preferably to the bottom of the vessel. A delivery pump can be arranged both inside the storage volume and outside the storage volume.

In the context of the present invention, a delivery pump is to be understood to be a functional unit which comprises at least one hydraulic part and one electric part, the electric part comprising the drive for the hydraulic part.

In one particularly preferred variant of the device according to the invention, it is provided that the delivery pump is arranged outside the storage volume and is connected to the delivery line via at least one sealed leadthrough in a wall of the storage vessel. The delivery pump can be arranged such that it is completely separated spatially from the storage vessel, that is to say recessed from the storage vessel, but it is provided as an alternative that the delivery pump is inserted as an exchangeable subassembly into an outer depression in the bottom of the storage vessel.

Since the filling level sensor can be placed independently of the arrangement of the delivery pump, it is possible, for example, to place an ultrasonic sensor as filling level sensor at the bottom of the storage volume. The position of an ultrasonic filling level sensor of this type is ideally selected in such a way that it is placed at the location of the highest possible liquid level inside the storage vessel.

For example, what is known as a combined sensor unit which comprises both an ultrasonic filling level sensor and a density sensor as quality sensor can also be provided as filling level sensor. The density sensor serves to ensure the correct concentration of the urea solution in the storage vessel and/or to detect a concentration which deviates from the standard.

In one particularly preferred variant of the device according to the invention, it is provided that the filter device comprises at least one filter element.

The delivery line can be branched inside the storage volume and can have a plurality of suction-side connections, in each case one filter element being connected upstream of said suction-side connections.

In addition, the delivery line can be heated from a filter element as far as a leadthrough in the vessel. For example, said delivery line can be buried in a plastic sheath with a heating coil cast into it.

The leadthrough through the wall of the vessel can comprise, for example, a plug-in connection, via which the delivery pump can be connected hydraulically and/or electrically.

For example, a plurality of sealed plug-in connections can be provided in a dome-shaped depression in the outer side of the bottom of the storage vessel, which plug-in connections are configured as leadthroughs through the wall of the vessel, into which leadthroughs the delivery pump or a delivery pump module can be inserted. A delivery pump module of this type can, for example, also comprise a recirculating pump and possibly a dedicated melting volume.

In the following text, the invention will be explained using two exemplary embodiments which are shown in the drawings, in which:

FIG. 1 shows a first exemplary embodiment of the device according to the invention, and FIG. 2 shows a second exemplary embodiment of the device according to the invention.

The device 1 which is shown in FIG. 1 of the drawing is extremely simplified. It comprises a storage vessel 2, of which only the bottom-side region in the installation position is shown for reasons of simplicity. The storage vessel 2 is produced, for example, from two half shells which are made from thermoplastic and are produced in one piece by injection molding. As an alternative, the storage vessel 2 can also be obtained by thermoforming or extrusion blow molding of web-shaped extrudates made from thermoplastic. The half shells are welded circumferentially to one another in order to produce the closed storage vessel 2. The storage vessel 2 encloses a storage volume 3 which receives an aqueous urea solution. The urea solution is fed by means of a metering line 4 of an injection device (not shown) on the exhaust gas section of a diesel internal combustion engine.

A branched delivery line 5, via which liquid urea is passed to the metering line 4 by means of a delivery pump 8, is laid inside the storage volume 3. The delivery line 5 is connected inside the storage vessel to two filter elements 7 which are placed in a stationary manner on the bottom 6 of the storage vessel 2. The filter elements 7 are shown in a greatly simplified form.

The filter elements 7 can be arranged at any desired location of the storage vessel 2, but they are preferably arranged at the lowest points of the storage volume 3 or of defined part volumes. The filter elements 7 in each case define fixed suction points on the bottom 6 of the storage vessel 2. In the exemplary embodiment which is described, the delivery pump 8 and a recirculating pump 10 are arranged in a pump module 9 which is fastened to the storage vessel 2 outside the storage volume 3. The filter elements 7 are in each case connected to the delivery pump 8 by way of the delivery line 5.

The delivery line 5 can be heated at least in its sections which are laid inside the storage vessel 2, for example by way of a heating wire encapsulation (not shown). The heating wire is configured in a known way as a resistance heating element.

As has already been mentioned above, the delivery pump 8 and the recirculating pump 10 are arranged inside the pump module 9, which recirculating pump 10 returns a urea volume which was not injected into the exhaust gas jet by the injection device to the storage vessel 2.

The pump module 9 is configured as a closed subassembly and is inserted into an outer depression 11 of the bottom 6 of the storage vessel 2. The pump module 9 does not necessarily have to comprise a recirculating pump 10. This is provided in the exemplary embodiment which is shown. The pump module 9 is connected electrically and/or hydraulically via at least one sealed leadthrough (not shown) to the functional groups inside the storage vessel 2. The functional groups comprise the filter elements 7 and a combined sensor 12. The combined sensor 12 comprises a density sensor and an ultrasonic filling level sensor, by means of which the filling level inside the storage volume 3 can be detected. The concentration of the urea solution inside the storage vessel 2 can be determined via the density sensor.

Both the combined sensor 12 and the filter elements 7 can be configured, for example, as functional groups which are configured integrally with the bottom 6 of the vessel, but they can also have been latched or welded to the bottom 6 of the storage vessel 2 during the production of the storage vessel 2.

The metering line 4 and other electric lines which are laid outside the storage vessel 2 can be guided, for example, out of the depression 11 via one or more groove channels in the bottom 6 of the vessel. The groove channel or channels can be provided, for example, as downwardly pointing open grooves in the bottom 6 of the storage vessel 2.

In the exemplary embodiment which is shown in FIG. 2, identical components are provided with identical designations. The device 1 according to FIG. 2 differs essentially from that in FIG. 1 in that the pump module 9 is not arranged directly on the storage vessel, but rather is set apart from the latter. The delivery lines 5 and the electric line to the combined sensor 12 are guided out of the storage vessel through leadthroughs which are provided for this purpose.

LIST OF DESIGNATIONS

1 Device
2 Storage vessel
3 Storage volume
4 Metering line
5 Delivery line
6 Bottom
7 Filter elements
8 Delivery pump
9 Pump module
10 Recirculating pump
11 Depression
12 Combined sensor

What is claimed is:

1. A device for storing and delivering a liquid additive in a motor vehicle, comprising:
    at least one storage vessel which defines a storage volume for the additive,
    at least one delivery pump,
    at least one delivery line arranged at least partially inside the storage volume and via which the additive is feedable by the delivery pump to an exhaust gas section of the motor vehicle,
    at least one filter device configured to filter the additive to be delivered,
    at least one heating device configured to heat the additive,
    at least one filling level sensor for the additive,
    wherein at least the at least one filter device, the at least one heating device, and the at least one filling level sensor are functional units and not part of a single functional unit within the storage volume,
    wherein all the functional units are arranged decentrally inside the storage vessel or on the storage vessel,
    wherein each of the at least one filter device, the at least one filling level sensor and the at least one delivery pump are separated from one another spatially,
    wherein the at least one filter device and the at least one filling level sensor are inside the storage volume and are fastened to a wall of the storage vessel inside the storage volume.

2. The device as claimed in claim 1, wherein the at least one delivery pump is located outside the storage volume and is connected to the at least one delivery line via at least one sealed leadthrough in at least one of a vertically extending wall or a bottom wall of the storage vessel.

3. The device as claimed in claim 2, wherein the leadthrough comprises at least one plug-in connection, via which the at least one delivery pump is connected hydraulically and/or electrically.

4. The device as claimed in claim 1, wherein the at least one delivery pump is located outside the storage volume beneath the at least one storage vessel in an outer depression in a bottom of the storage vessel.

5. The device as claimed in claim 1, wherein the at least one filter device comprises at least one filter element.

6. The device as claimed in claim 1, wherein the at least one delivery line has a plurality of suction-side connections inside the storage volume.

7. The device as claimed in claim 6, wherein the at least one filter device comprises at least one filter element, and the at least one filter element is connected upstream of the suction-side connections.

8. The device as claimed in claim 1, wherein the device is configured to store and deliver a catalytic exhaust gas $NO_x$ removal additive.

9. The device as claimed in claim 1, wherein the at least one filter device and the one filling level sensor are fastened to a bottom wall of the vessel.

10. A device for storing and delivering a liquid additive in a motor vehicle, comprising:
    at least one storage vessel which defines a storage volume for the additive,
    at least one delivery pump,
    at least one delivery line arranged at least partially inside the storage volume and via which the additive is feedable by the delivery pump to an exhaust gas section of the motor vehicle,
    at least two heated filter devices configured to filter and heat the additive to be delivered,
    at least one filling level sensor for the additive,
    wherein the at least one delivery pump, the at least two heated filter devices, and the at least one filling level sensor are functional units,
    wherein all the functional units are arranged decentrally inside the storage vessel or on the storage vessel,
    wherein each of the at least two heated filter devices, the at least one filling level sensor and the at least one delivery pump are separated from one another spatially,
    wherein each of the at least two heated filter devices and the at least one filling level sensor are inside the storage volume and are fastened to a wall of the storage vessel, and
    wherein each of the at least two heated filter devices are fluidly connected to the at least one delivery pump via the at least one delivery line, and the at least one delivery line extends horizontally within the storage volume.

11. The device as claimed in claim 10, wherein the at least one delivery pump is located outside the storage volume and is connected to the at least one delivery line via at least one sealed leadthrough in at least one of a vertically extending wall or a bottom wall of the storage vessel.

12. The device as claimed in claim 11, wherein the leadthrough comprises at least one plug-in connection, via which the at least one delivery pump is connected hydraulically and/or electrically.

13. The device as claimed in claim 10, wherein the at least one delivery pump is located outside the storage volume beneath the at least one storage vessel in an outer depression in a bottom of the storage vessel.

14. The device as claimed in claim 10, wherein the at least one filter device comprises at least one filter element.

15. The device as claimed in claim 10, wherein the at least one delivery line has a plurality of suction-side connections inside the storage volume.

16. The device as claimed in claim 15, wherein the at least one filter device comprises at least one filter element, and the at least one filter element is connected upstream of the suction-side connections.

17. The device as claimed in claim 10, wherein the device is configured to store and deliver a catalytic exhaust gas $NO_x$ removal additive.

18. The device as claimed in claim 10, wherein the at least one filter device and the one filling level sensor are fastened to a bottom wall of the vessel.

* * * * *